United States Patent [19]
Chakravorty

[11] Patent Number: 6,018,530
[45] Date of Patent: Jan. 25, 2000

[54] METHOD FOR TRANSMITTING USING A MODIFIED TRANSPORT CONTROL PROTOCOL

[75] Inventor: Sham Chakravorty, 1405 Mayhurst Blvd., McLean, Va. 22102

[73] Assignee: Sham Chakravorty, McLean, Va.

[21] Appl. No.: 08/874,303

[22] Filed: Jun. 19, 1997

[51] Int. Cl.[7] .................. H04J 3/16; H04J 3/22; H04L 12/28; H04L 12/56
[52] U.S. Cl. .................. 370/471; 370/401
[58] Field of Search .................. 370/400–403, 370/473, 474, 466, 471, 489, 389, 392

[56] References Cited

U.S. PATENT DOCUMENTS

| | | | |
|---|---|---|---|
| 5,784,362 | 7/1998 | Turnia | 370/321 |
| 5,892,924 | 4/1999 | Lyon et al. | 395/200 |

*Primary Examiner*—Douglas W. Olms
*Assistant Examiner*—David R Vincent

[57] ABSTRACT

Described is a method for switching Transmission Control Protocol (TCP) data streams for a fast delivery of voice, video, image or data, or a combination thereof, from one (or more) system(s) to one (or more) other system(s) based on inventor's TCP switching design. The proposed TCP switching system further provides for the consolidation of multiple data protocols in the conventional five-layer stack of Internet protocols, namely, Physical (layer 1), Data Link (layer 2), Network (layer 3), Transport (layer 4), and Application (layer 5). In this patent, the organization of this modified TCP, called the Fast TCP protocol, and the algorithm for establishing communications between any two or more end-systems through any number of intermediate TCP switches, called the Fast TCP switches, are described. The method of TCP switching is installed in the end-systems and intermediate Fast TCP switches to provide medium-independent communications. The medium of communication can be any medium such as copper, fiber or radio.

3 Claims, 2 Drawing Sheets

LEGEND –
HDR = HEADRER
L = LENGTH

LEGEND –
HDR = HEADRER
L = LENGTH

LEGEND –
HDR = HEADER
L = LENGTH

METHOD FOR TRANSMITTING USING A MODIFIED TRANSPORT CONTROL PROTOCOL

BACKGROUND OF THE INVENTION

In order to set up a communication between any two or more computer systems or similar other systems, any digitized delivery of voice, video or data has to meet the rules of the five layers of the Internet and other families of protocols. The topmost layer (layer 5) is the Application layer that represents such protocols as File Transfer Protocol (FTP), Simple Mail Transfer Protocol (SMTP), Telnet, and others. The next two protocol layers, layers 4 and 3, are called TCP and Internet Protocol (IP). These are used by the systems attached to the Internet and other private networks. The layer 2 is the Data Link layer protocol. The examples for the layer 2 are Ethernet, Fiber Distributed Data Network (FDDI), Frame Relay (FR) and Asynchronous Transfer Mode (ATM). Some of these layer 2 protocols transgress into other protocol layers, above and below, as dictated by the nature of transmission rules of the protocol. The bottom Physical layer (layer 1) is represented by the physical medium of transmission such as the single-mode or multi-mode fibers used for ATM, twisted copper pairs used in Local Area Networks (LANs), radio channels for Wide Area Networks (WANs), and related hardware.

The conventional mode of transmission of digitized signals, hereinafter called digital transmission or simply data to represent all forms of digital transmissions such as voice, video, text, and image, is generally datagram based. Datagram implies a preassigned set of data bits, grouped together in what is called a packet, that is transferred from one end-system to another more like postal mail delivery system. Each packet has a header that carries information about the packet such as its source system address, destination system address, its length, a methodology to check its accuracy and some other related information. For instance, the header for IP packet, which is a minimum 20 Bytes (160 bits), carries information such as version, length of the header, type of service, total length, identification (of the packet), flags (to activate certain options), fragment offset (identifying a portion of the packet if it is not the whole packet), time to live, protocol number, header checksum source IP address, destination IP address, options, and padding (of bits if necessary). All these can use up to 64 Bytes of data. The data portion of the IP packet follows the header. Any other type of frame or packet (all hereinafter referred to as packet only) has a similar bit make-up.

For smaller packets, such as in the case of ATM packets, a larger overhead of header data compared to its data content (called payload) is employed. Use of such high overhead causes congestion in the traffic channels and slows down transmissions. This is further compounded by the fact that raw data output from an end-system is encapsulated by the protocol packet from the layer below which is further encapsulated by the protocol packet from the layer still below and so on. For example, to the TCP header is added the IP header, to which is added the FR header and so on down the protocol suite to transmit an e-mail coming out of an end-system that rides on, say, an FR network.

Overheads burden transmission and network latency. The current environment of multi-protocol usage both in the LANs and WANs add an inordinate amount of header overheads to raw data, that is raw information content, thereby greatly slowing the process of transmission as well as adding to the potential for errors, traffic congestion and delay. The reasons are obvious: the bulk of bits transmitted and complex rules of individual protocols increase the barriers to a smooth traffic flow significantly. This environment is further complicated by the fact that TCP is session oriented protocol on top of the IP and other protocols which are oriented as datagram protocol. The former (TCP) establishes a virtual or logical connection between two end-systems while the latter (IP) provides real routing of packets along the most suitable path decided by the (packet) routing mechanism.

The proposed invention, comprising TCP switching, eliminates the multi-protocol complexities for the first time. The invention provides the tool for converting the conventional or classical TCP into Fast TCP resulting in the SLAP. In brief, this mechanism establishes a TCP session through TCP switching devices thereby eliminating the need for layer 2 switches, layer 3 routers and all other multiplexing or concentrator devices.

SUMMARY OF THE INVENTION

This invention comprises a mechanism that eliminates the need for multiple layers of protocols for transmission of data, voice and video. The mechanism provides the means for switching TCP data traffic in a session oriented mode. This is accomplished by the inclusion of source and destination port addresses of the end-system applications along with the provision for logical links and sub-links for fast transmission between the intermediate switches. The system therefore provides for addressing of TCP data through port addresses as well as virtual communication paths. Additionally, the system provides for establishment of any bandwidth for data transmission limited only by the throughput of physical media of transmission and the end-system buffer sizes. The system, as described in this patent, allows for a session as long or as short as the users or the end-systems system wish.

By using this Fast TCP mechanism, the need for IP packets is eliminated. The user need not use layer 2 protocols either, such as Ethernet or ATM, thereby saving a significant amount of bandwidth for link set ups and controls, and avoiding errors and delays. What is left is then the application running in the end-system which is directly passed on to the TCP switching protocol (layer 4 protocol) and from there to the Physical media (layer 1). So all layer 2 and 3 protocols are totally eliminated. Eliminated also are several layer 4, such as User Datagram Protocol (UDP) and layer 5 (Ping) protocols. This provides for a simple, robust and reliable transfer of data from layer 5 to layer 1 via layer 4 which is now the Fast TCP.

Thus the advantages of using TCP switching as the only transport protocol for sending digitized signals between two or more protocols are many. A summary is provided below.

Since IP datagrams are avoided, no routing of protocols takes place thereby avoiding routing delays such as those caused by the asynchronous receipt of IP datagrams and the subsequent need to resequence the data, router-to-router path identification process, packet forwarding process and also the overhead of the IP header. This is true of the layer 2 protocols also.

Since datagram transmission can take place through any number of unknown routers (especially in case of the Internet) and no checksum of the body of the data is done by the IP layer, the security of data is compromised. Fast TCP, on the other hand, maintains a checksum of both its header and data, flow control, and management at the end-systems as well as the intermediate Fast TCP switches. Any corruption or modification of data in transit is therefore immediately detected. This provides built-in security and data integrity.

Fast TCP also all speeds of data delivery on any type of media in a session oriented mode. So, both voice and video are included with raw data in the transmission process by careful selection of port addresses. All three forms of transmission can travel the same path in Fast TCP so long they are identified separately to port addresses.

All these therefore add to significant cost and time savings providing the most efficient form of digital transmission of voice, data and video as well as in the savings of installed equipment and the staffing required to operate and maintain them.

DESCRIPTION OF THE PREFERRED EMBODIMENT

Although the disclosure hereof is detailed and exact to enable those skilled in the art to practice the invention, the software and hardware embodiments disclosed herein merely exemplify the invention which may be embodied in other specific software and/or hardware structures.

The scope of the invention is defined in the claims appended hereto.

Figure 1:
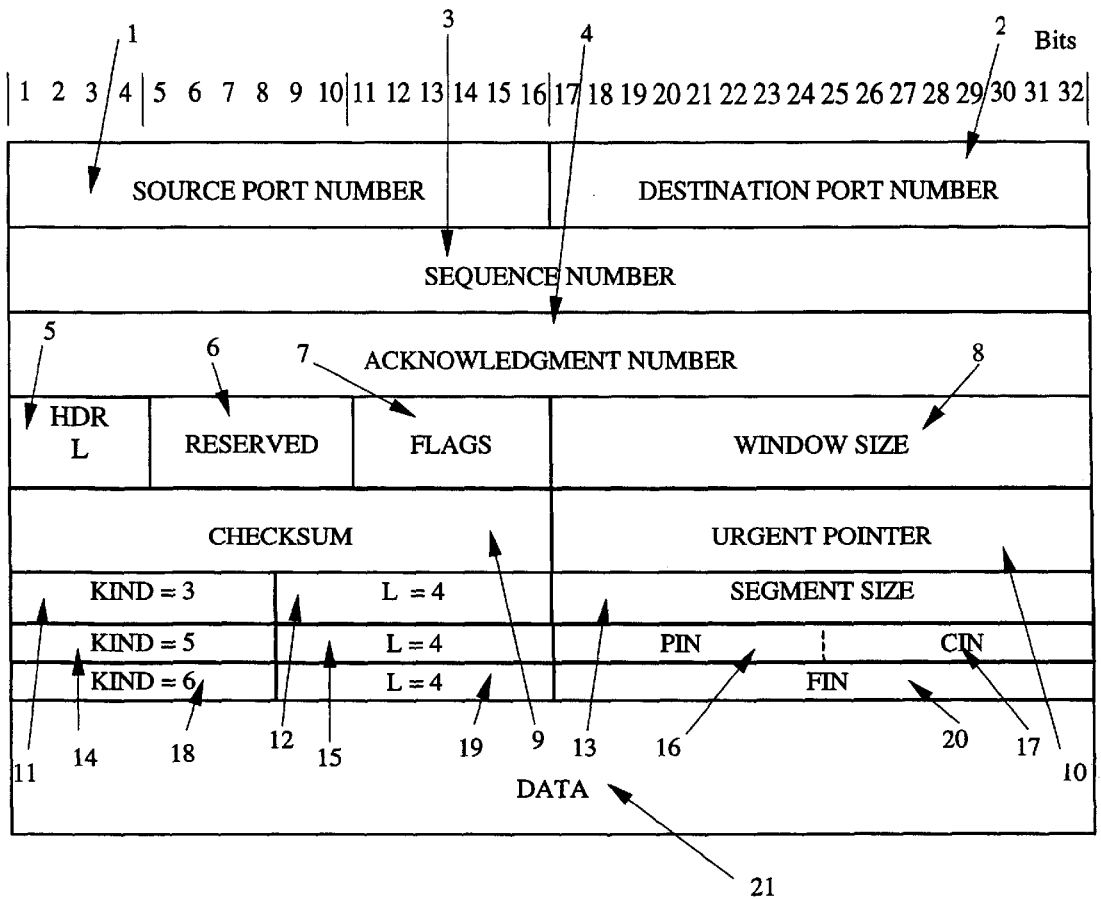
FIG. 1 is view of the Fast TCP header with Fast TCP Options.

As shown in FIG. 1, Fast TCP retains the header format of the classical TCP as identified by parts numbered from 1 through 10. The uniqueness of Fast TCP, different from the classical TCP, lies in the assignment of bit patterns to the 6-bit field called Reserved field, which is identified as part number 6, and assigning new functionalities to the Option field, parts identified as 11 through 20, to provide the needed functionalities of Fast TCP.

In the classical TCP, the Reserved field of 6 bits is not used at all. They are all zeros. In the proposed Fast TCP, the first bit of the 6 bits in this field is set (made 1 from zero) prior to the transmission of the Fast TCP segment of the type described here. This indicates to the TCP segment receiver that the format of the Fast TCP has been applied. The remaining parts, 1 through 10 excluding 6, of the first twenty bytes of the classical TCP header are retained in the Fast TCP. In the Fast TCP, three basic options are added in the Option field, identified in parts 11 through 20, prior to the Data field as identified in part number 21. These options begin and end on octet boundaries as in the classical TCP.

The classical TCP allows only three options that are of little consequence and as such add little or no value to the technology. In contrast, the Fast TCP functionalities available in the Option filed add a host of functionalities to classical TCP and render it free of all other protocols in its and other layers below it. These Fast TCP options make the size of the Fast TCP header 32 bytes long including the conventional TCP functionalities, as identified by the parts 1 through 10, which make up a total of 20 bytes.

The three basic Fast TCP options proposed are provided below.

Case 1: The first octet, identified as part 11, defines option kind 3 (00000011). The second octet, identified as part 12, defines length 4 (00000100) in octets. The third and fourth octets together, indicated in part 13, define fixed segment size suitable for voice and video transmissions. This option is used for fixed segment transmissions as in the case of voice. This fixed size is recommended to be 64 bytes in total.

Alternative to the above selection, if a variable length message is used for raw data or image, the above option fields are replaced by the following selection. The first octet, identified as part 11, defines kind 4 (00000100). The second octet, identified as part 12, defines length 4 (00000100) in octets. The third and fourth octets together, identified as part 13, define variable segment size suitable for data and other asynchronous transmissions. The option kinds 3 and 4 are mutually exclusive for the same segment.

Case 2: The first octet, identified as part 14, defines kind 5 (00000101). The second octet, identified as part 15, defines length 4 (00000100) in octets. The third octet, identified as part 16, defines the Path Identification Number (PIN) and if the length identifies four octets in all, then the fourth octet in this option kind, identified as part 1, defines Channel Identification Number (CIN). The PIN identifies a unique path which is analogous to the logical or virtual circuit representation of a trunk circuit implemented in common telephony. The length of the path is allowed to vary from an 8-bit definition to 16-bit definition. There are thus a range of 1 to 255 logical or virtual paths for single octet part 16 and a maximum of 65,535 virtual paths for a two-octet part 16 ignoring all zeros in these octets. Similar to a path and identified by a unique CIN, a channel is a subset of a path and is logically analogous to the channel in common telephony. There are thus a range of 1 to 255 logical channels for a single octet part 1 and a maximum of 65,535 logical or virtual channels in two octet part 1 ignoring all zeros in these octets. The combination of path and channel in option kind 5 identifies a link, which is a virtual circuit, between any two Fast TCP switches or between a Fast TCP switch and a Fast TCP end-system for the duration of a connection. For any connection, there could be one to two octects for a path connection and one to two octets for channel. There will always be a minimum of one path and one channel in any link. Any application running on a Fast TCP end-system will have only one virtual connection to another end-system. Such a connection will be identified by the PIN, CIN, the source port address and the destination port address of the application.

Case 3: The first octet, identified as part 18, defines kind 6 (00000110). The second octet, identified as part 1, defines length 4 (00000100) in octets. The third and fourth octets together, identified as part 20, define Flow Information Notification (FIN). The FIN defines the requirements for flow control and network management variables. Examples are: constant bit rate, variable bit rate, buffer overflow, congestion in the forward direction, congestion in the backward direction, and other traffic and switching parameters.

Constant bit rate connection is identified by one set bit, the last bit, in the fourth octet of this option. Variable rate is identified by two set bits, the last two bits, in the fourth octets of this option. Connections with variable bit rate must negotiate a range of bit rates between two values. These values are minimum and maximum bit rates, and a maximum burst size at the time of connection establishment.

Examples for the last two octets in part 20 are given below.

| | |
|---|---|
| Constant Bit Rate | 00000000 00000001 |
| Variable Bit Rate | 00000000 00000010 |

The maximum bit rate with maximum burst size will define the peak maximum to be used for a connection. The variable bit rate will be used for video and data. The remaining six bits in the fourth octet, identified as part 20, define other flow related parameters. Examples are given below.

| | |
|---|---|
| Forward Congestion Notification (FCN) | 00000000 00000100 |
| Backward Congestion Notification (BCN) | 00000000 00000101 |

Case 4 (Optional case): This is an optional addition to the first four options described above. In this option, the first octet defines kind 7 (00001011), second octet defines length 4 (00000100) in octets, third octet identifies the type of message while the fourth and later octets carry the message itself. All five octets together define Management Information Notification (MIN). This provides administrative, operational, maintenance and security information to the system administrator and users. The examples of such information are: system set up and tear down, system active and inactive, real-time and historical statistical data, network usage at any time, alarm conditions, failures and repairs, undesirable Fast TCP switch or end-system log-ins, undesirable segments in the network, faulty segments, and other similar information.

Instances of the third and fourth octets are provided below for a selection of management functionalities. Implementors or standards bodies will provide same or similar arrangements.

| | |
|---|---|
| Set Up Local System | 00000000 00000000 |
| Set Up Remote System 1 | 00000001 00000000 |
| Set Up Remote System 2 | 00000010 00000000 |
| : | : |
| : | : |
| : | : |
| Set Up Remote System 256 | 11111111 00000000 |
| Bring Down Local System | 00000000 00000001 |
| Bring Down Remote System 1 | 00000001 00000001 |
| Bring Down Remote System 2 | 00000010 00000001 |
| : | : |
| : | : |
| Bring Down Remote System 256 | 11111111 00000001 |
| Hello Local System | 00000000 00000010 |
| Hello Remote System 1 | 00000001 00000010 |
| Hello Remote System 2 | 00000010 00000010 |
| : | : |
| : | : |
| Hello Remote System 256 | 11111111 00000010 |
| No Local System | 00000000 00000011 |
| No Remote System 1 | 00000001 00000011 |
| No Remote System 2 | 00000010 00000011 |
| : | : |
| : | : |
| No Remote System 256 | 11111111 00000011 |
| Local System Alive | 00000000 00000100 |
| Remote System 1 Alive | 00000001 00000100 |
| Remote System 2 Alive | 00000010 00000100 |
| : | : |
| : | : |
| Remote System 256 Alive | 11111111 00000100 |

All remote systems in the above description are directly or indirectly connected to the local system. Therefore, the system administrator or user will set up remote system as well as manage remote system from the local system. This provides a unique strength to the Fast TCP protocol.

More messages are built up in this manner for robust and reliable propagation of network management information. It is noteworthy to see that as many 256 messages are available for system administration and operation. This is much wider a selection of network management variables than available in any of the contemporary protocols. If the implementor so chooses, more messages are added by increasing the length of this option on octet boundaries.

The option kind numbering scheme presented above as 3, 4, 5, 6, and 7 are instances of a selection only. These numbers will be different for any Fast TCP standard implementation selected differently but the effect of the implementation will be the same as in fast TCP. Other options are similarly added for other features as Fast TCP standards body would want.

A connection is set up either in the PVC mode or in the SVC mode. Each set up identifies the first message with the SYN Flag bit set in part 7. In case of the PVC set up, the system administrator assigns PIN, CIN and the application source number to each connection as needed. The destination port number is a well-known port assignment. These assignments remain constant for the duration of a connection. A new set of assignments is generated each time a new set of connections is set up. The new set may retain the same PINs and CINs as from the previous suite of connections if desired.

The administrator also selects a number of functionalities that are necessary for the network and system housekeeping. Instances of this are: set up time, log of PIN and CIN of each connection, number of failures of each connection by PIN and CIN, statistical data on failures by connection and time of day, statistical data on FCNs and BCNs, duration of failure of a connection and similar other requirements.

The sequence of events in SVC set up is an automated procedure. The procedure is initiated by an application wanting to send data to a remote location. It works as follows.

1. The local system transmits a Fast TCP segment with option kind 3 (or 4), 5 and 6, as identified in parts 11 through 20, with the SYN Field set, as identified in part 7 to the nearest connected Fast TCP switch identified in the local system's switch availability table. This table is generated at the time the local system is physically connected to one or more remote switches. In this table, each end-system as well as each Fast TCP switch is associated with a group of connected switches that bear hierarchical connections heading toward the desired end-systems. For instance, an end-system in Philadelphia, USA, trying to set up a connection for messages going to Tokyo, Japan, will look for Fast TCP switches connected to Fast TCP continental gateway switches marked for Asia. The continental gateway switches will comprise switching tables for other continental Fast TCP switches listing continents. For connections within a continent, the Fast TCP switches will in turn have listing by country and within a country, by states or regions of the country. Within a region, the listing will go down to the city, county and still more granular levels. The configuration of the Fast TCP switching tables will be determined by the network service providers as well as the local and regional communication control administration.

The cascading switching tables will thus follow rules of connection set up similar to modem digital telephony. The greater the region covered by a switch, larger is its table for referencing the best choice of connection to the remote end-system. The switching table also provides selected characteristics for the connections. The Fast TCP switch availability table has local significance only. The local system or switch thus always selects the nearest Fast TCP switch that is available.

2. The local system issues unique PIN and CIN, identified in parts 16 and 17, starting with 1 and 1 or any other chosen set of two numbers for the connection that is being set up to the nearest available Fast TCP switch.

3. The three way handshake similar to that in the classical TCP connection set up follows with a timer started to track acknowledgment delays.

4. Once the connection is set up, the local system does housekeeping. As a minimum, it maintains a log of PINs and CINs for all connections associated with the remote system applications for the duration of the connection. It starts a timer with the start of a connection to develop a log of statistical data on the connection.

5. The SVC set up continues from local system to the first connected Fast TCP switch which in turn continues the process by sending the Fast TCP message to its nearest connected switch. The process continues from switch to switch until the remote end-system has been connected by the last switch in tandem.

6. The local system then sends the data traffic after receiving the acknowledgment from the remote end-system. Once the data flow starts between the two end-systems, the intermediate Fast TCP switches do not send acknowledgment back to the sending switch system for each segment received, nor do they carry out checksum calculation. Checksum is done after the data is passed through to the next switch. It is done to determine if the received data was corrupted. If so, it sends a MIN message of the appropriate type to the sending switch which helps cascade it down to the sending end-system where the segment is regenerated and sent again. This process is significant in providing the speed in Fast TCP switching. If a subsequent segment is received when the checksum is being done on the previous segment, which was in error, the case is handled in a manner similar to the way an end-system handles such as event in the classical TCP.

No window sliding takes place in a Fast TCP switch. If the receiving buffer in a Fast TCP switch approaches its capacity, a suitable MIN message is sent to the sending System. In case of congestion, FCN or BCN messages are generated and sent by the switch.

Tear down of a SVC connection is much simpler and similar to classical TCP. The system wanting to close the connection sends a message with the FIN Flag in part 7 set. The receiving system, if it is a Fast TCP switch, continues to send the message on the prescribed PIN and CIN.

Figure 2:
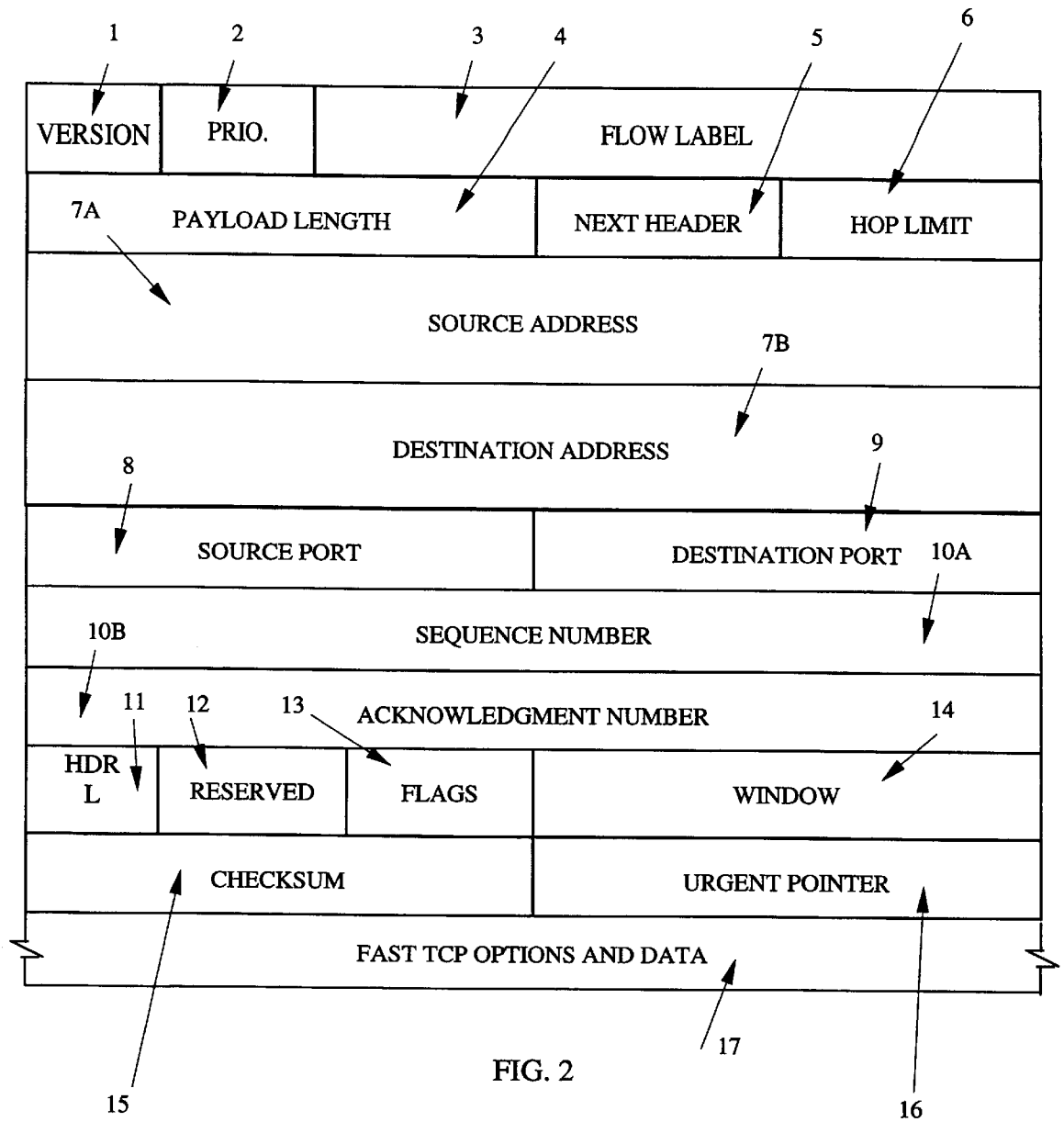
FIG. 2 is a view of the Fast TCP with conventional IPV6 (IP Version 6) header.

It is estimated that it will be three to four years before Fast TCP will be adopted by the majority of the users. In order therefore to make a smooth transition from classical TCP to Fast TCP, the IPV6 address is included in the Fast TCP header with a selection of options in the Option field as shown in FIG. 2. This transforms a Fast TCP segment into an IPV6 packet. But the handling of the packet at layer 4 is same as Fast TCP since the options behave as described above. However, all classical layer 2 and 3 protocols will treat such Fast TCP segments as IP packets thereby eliminating the need for emulation of IP packets.

As more and more Fast TCP switches and systems are implemented, pure Fast TCP segments will be used. Therefore, during the transition period, the Fast TCP header will not use the 1 as the first bit in part 6. This implies that a Fast TCP switch and end-system will have the dual capability of acting as a router as well as a Fast TCP switch. As a routers, these switches will route IPV6 packets.

Having thus described the invention, I claim:

1. A method for transmitting data, voice, and video between a source and a remote station wherein data/packets are transmitted using a modified/Switched/Fast Transport Control Protocol (TCP), the method comprising:

transmitting a packet to a remote station using said Fast TCP wherein said packet comprises:
   at least one option which comprises three fields,
   a Kind field which defines the type of option,
   a Length field which defines the total length of said at least one option in octets, and
   a Size/Value field which defines the contents of said at least one option using at least one content identifier which comprises of:
      a fixed or variable length segment/packet size indicator,
      a Path Identification Number (PIN), and a Channel Identification Number (CIN) for identifying virtual circuits VCSCs) between systems or nodes,
      a packet flow control parameter, or
      a network management parameter which can include packet checksum parameters,
   wherein each field is a minimum of one octet, said fields are arranged in a predefined manner in the TCP option field, and said at least one option ends on the octet boundary, and
receiving and processing said packet at said remote station.

2. A method as defined in claim 1 further including (a) broadcasting system look-up or address resolution messages of Fast TCP packets through all system ports or interfaces during system start up wherein said packets comprise:
   interface addresses, system IP addresses, values for setting up VCS with adjacent systems, VC bandwidths or message delivery priorities, corresponding station interface and IP addresses, and/or acknowledgment messages comprising corresponding source VC identifiers and bandwidth values, (b) completing a three-way VC set up message exchange, and (c) setting up access tables wherein said access tables are used to transmit and receive data/packets on the VCS.

3. A method for transmitting data using the Fast TCP protocol as defined in claim 1 wherein the Fast TCP is compatible with conventional protocols and has the capability of using IPV6 addresses.

* * * * *